United States Patent [19]

Masaki et al.

[11] Patent Number: 5,010,489
[45] Date of Patent: Apr. 23, 1991

[54] ANTI-SKID CONTROL SYSTEM WITH A COMMON BRAKING PRESSURE CONTROL DEVICE FOR DIFFERENT WHEELS

[75] Inventors: Shouichi Masaki, Chiryu; Akira Fukushima, Kariya; Shusaku Fujimoto, Kariya; Makoto Nakano, Kariya, all of Japan

[73] Assignee: Nippondenso Co., Ltd., Kariya, Japan

[21] Appl. No.: 332,799

[22] Filed: Apr. 3, 1989

[30] Foreign Application Priority Data

Apr. 5, 1988 [JP] Japan .................................. 63-83370

[51] Int. Cl.$^5$ .............................................. B60T 8/82
[52] U.S. Cl. .................................. 364/426.02; 303/96; 303/97
[58] Field of Search ........................... 364/426.02, 565; 303/96, 97, 100; 180/197

[56] References Cited

U.S. PATENT DOCUMENTS

| | | | |
|---|---|---|---|
| 4,134,621 | 1/1979 | Smedley et al. | 303/96 |
| 4,566,737 | 1/1986 | Masaki et al. | 303/109 |
| 4,670,852 | 6/1987 | Masaki et al. | 364/565 |
| 4,675,819 | 6/1987 | Fennel | 364/426.02 |
| 4,715,662 | 12/1987 | Van Zanten et al. | 303/109 |
| 4,748,565 | 3/1988 | Toya | 364/431.05 |
| 4,811,232 | 3/1989 | Hoashi et al. | 364/426.02 |
| 4,896,924 | 1/1990 | Kawana et al. | 303/96 |

FOREIGN PATENT DOCUMENTS

52-112093 9/1977 Japan .
1431466 4/1976 United Kingdom .
1581943 12/1980 United Kingdom .

*Primary Examiner*—Thomas G. Black
*Attorney, Agent, or Firm*—Cushman, Darby & Cushman

[57] ABSTRACT

An anti-skid control system for use in a motor vehicle which includes a braking pressure adjusting device associated in common with at least first and second wheels of the motor vehicle to control braking pressures applied thereto. The anti-skid control system includes first and second wheel speed sensors for sensing rotational speeds of the first and second wheels, respectively, and a vehicle state detector for detecting a state of the motor vehicle such as a speed of the motor vehicle. Also included in the anti-skid control system is a control unit for controlling the braking pressure adjusting device on the basis of the sensed rotational speeds of the first and second wheels and the detected state of the motor vehicle. The control unit determines a weighting coefficient on the basis of the detected vehicle state and calculates a weighted average wheel speed on the basis of the determined weighting coefficient and the sensed rotational speeds. The control unit generates a control signal to the braking pressure adjusting device so that the braking pressure is controlled in accordance with the calculated weighted average wheel speed.

12 Claims, 12 Drawing Sheets

ANTI-SKID CONTROL SYSTEM WITH A COMMON BRAKING PRESSURE CONTROL DEVICE FOR DIFFERENT WHEELS

BACKGROUND OF THE INVENTION

The present invention relates generally to a anti-skid control system for use in motor vehicles to control the speed of each of the wheels of the motor vehicle so as to prevent locking of the wheels on a vehicle braking operation, and more particularly to such an anti-skid control system having a braking pressure control device associated in common with different wheels.

An approach taken currently in order to simplify the arrangement of anti-skid control system by controlling the braking pressures of separate wheels through a common braking pressure control device. An important problem in such an anti-skid control system is that the common braking pressure control device is required to choose between speeds of the separate wheels in execution of the anti-skid control and difficulty may be encountered to effect optical braking operations for both the separate wheels. One known way, as disclosed in Japanese Patent Provisional Publication No. 52-112093 (corresponding to GB 1581943), involves taking different wheel speed selections between the front side wheels and the rear side wheels. For example, the lower wheel speed is selected between the speeds of the front side wheels and the higher wheel speed is selected between the speeds of the rear side wheels. There is a problem which arises with such a way, however, in that, although one of the front side wheels will have an excellent braking efficiency due to provision of a sufficient braking force, the other of the front side wheels results in deterioration of the steering performance due to locking and further the braking efficiencies of both the rear side wheels are lowered due to unsufficient braking forces thereto. Thus, a further improvement would be required from the viewpoint of vehicle travelling stability in anti-skid control execution.

SUMMARY OF THE INVENTION

It is therefore an object of the present invention to provide an anti-skid control system which capable of ensuring the vehicle travelling stability irrespective of use of a common braking control device for separate wheels.

With this and other objects will be become apparent as the description proceeds, the present invention relates to an anti-skid control system for use in a motor vehicle which includes a braking pressure adjusting device associated in common with at least first and second wheels of the motor vehicle to control braking pressures applied thereto. The anti-skid control system includes first and second wheel speed sensors for sensing rotational speeds of the first and second wheels, respectively, and a vehicle state detector for detecting a state of the motor vehicle such as a speed and a deceleration of the motor vehicle. Also included in the anti-skid control system is an electronic control unit, comprising a microcomputer having a central processing unit (CPU) and its associated units, for controlling the braking pressure adjusting device on the basis of the sensed rotational speeds of the first and second wheels and the detected state of the motor vehicle. A feature of the present invention is that the electronic control unit determines a weighting coefficient on the basis of the detected vehicle state and calculates a weighted average wheel speed on the basis of the determined weighting coefficient and the sensed rotational speeds, and generates a control signal to the braking pressure adjusting device so that the braking pressure to be applied to the first and second wheels is controlled in accordance with the calculated weighted average wheel speed. This arrangement appropriately provides braking efficiency or running stability for the motor vehicle.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
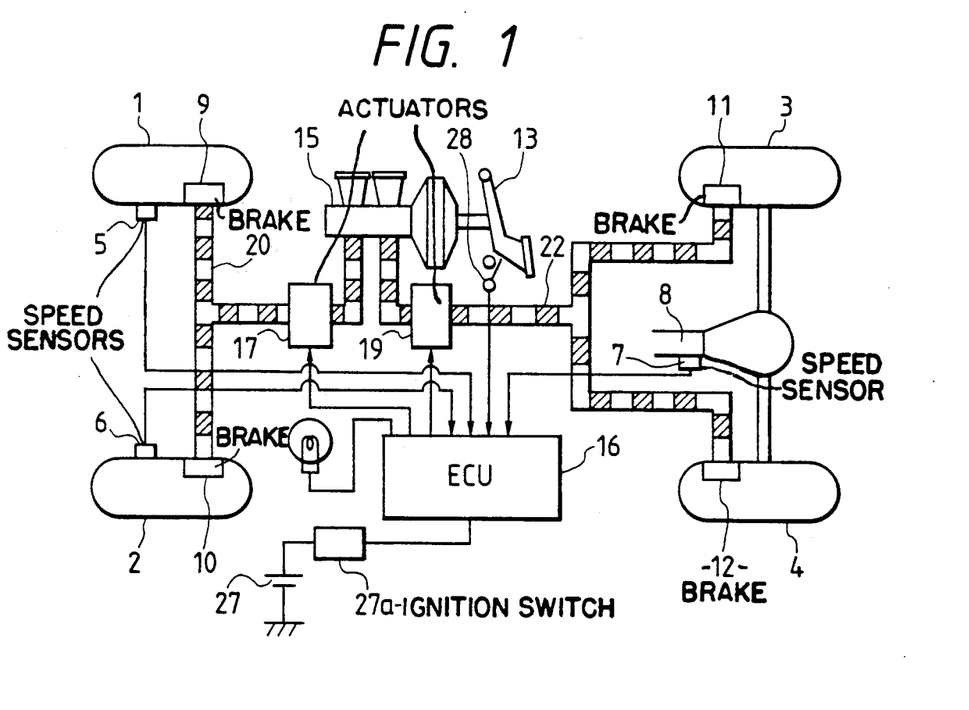
FIG. 1 is a schematical diagram showing an anti-skid control system according to an embodiment of the present invention which is incorporated into a braking system of a motor vehicle.

Referring now to FIG. 1, there is schematically illustrated the entire arrangement of an anti-skid control system according to an embodiment of the present invention which is incorporated into a motor vehicle having a front-right wheel 1, a front-left wheel 2, a rear-right wheel 3 and a rear-left wheel 4. The front wheels 1, 2 are respectively associated with wheel speed sensors 5, 6 and the rear wheels 3, 4, i.e., driven wheels, are associated with a single wheel speed sensor 7 which is mounted on a propeller shaft 8 for transferring a driving force to the rear wheels 3, 4, each being of the electromagnetic pickup type or the photo-electric converting type to generate a wheel speed signal in accordance with rotation of the corresponding wheel. Illustrated at numerals 9 to 12 are hydraulic pressure braking devices which are responsive to a hydraulic pressure from a hydraulic pressure cylinder 15 operable in response to depression of a brake pedal 13 so as to provide hydraulic pressure braking forces to the respective wheels 1 to 4. The hydraulic pressure from the hydraulic pressure cylinder 15 is supplied to the respective wheels 1 to 4 through two actuators 17, 19 which are controlled in accordance with control signals from an electronic control unit (ECU) 16, which will hereinafter be described in detail, so as to realize appropriate braking operations for the respective wheels in terms of anti-skid control. The actuators 17, 19 are adapted to take a pressure-increasing mode, pressure-maintaining mode and a pressure-decreasing mode in accordance with the control signal from the electronic control unit 16, the actuator 17 being used in common to the front wheel side braking devices 9, 10 and the acutator 19 being used in common to the rear wheel side braking devices 11, 12. The hydraulic pressure from the actuator 17 is led through a hydraulic passage 20 to the front side braking devices 9, 10 and the hydraulic pressure from the actuator 19 is introduced through a hydraulic passage 22 to the rear side braking devices 11, 12.

Figure 2:
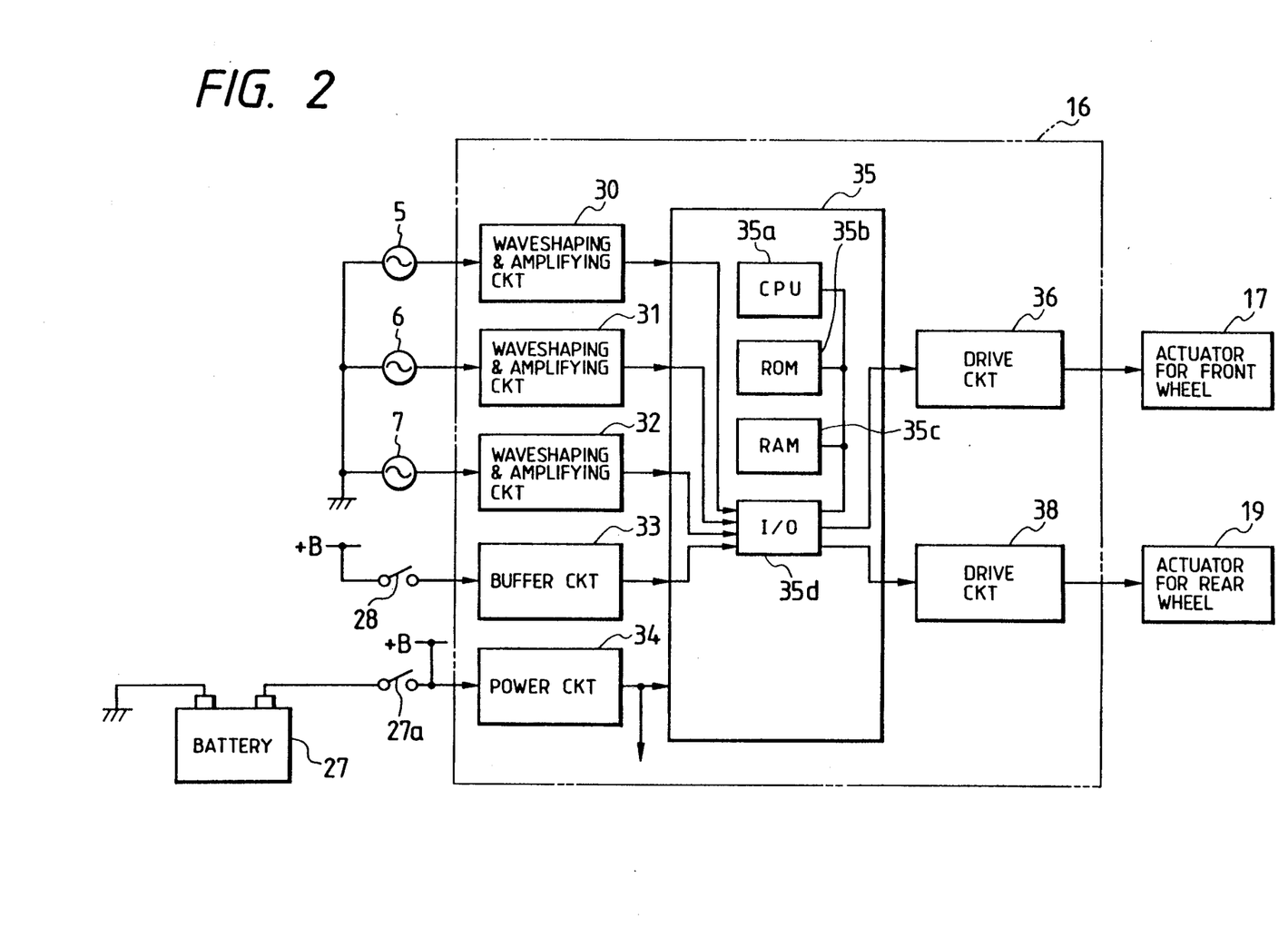
FIG. 2 is a block diagram showing an arrangement of an electronic control unit built in the anti-skid control system for an anti-skid control execution.

FIG. 2 is a block diagram showing an arrangement of the electronic control unit 16. In FIG. 2, the electronic control unit 16 is powered by a power source, i.e., battery, 27 through an ignition switch 27a of the motor vehicle and operable in response to turning-on of the ignition switch 27a. The electronic control unit 16, comprising a microcomputer 35, is coupled to input signals indicative of vehicle conditions and generates the control signal on the basis of the input signals so as to control the actuators 17, 19, i.e., braking hydraulic pressures to the hydraulic pressure braking devices 9 to 12. The output signals, i.e., wheel speed signals, of the respective wheel speed sensors 5 to 7 are supplied through waveshaping and amplifying circuits 30 to 32 to the microcomputer 35, the electric power is led through a power circuit 34 to the microcomputer 35, and the output signal of a stop switch 28 for detecting operation of the brake pedal 13 is supplied through a buffer circuit 33 to the microcomputer 35. Each of the waveshaping and amplifying circuits 30 to 32 converts the wheel speed signal into a pulse signal acceptable to the microcomputer 35 and the power circuit 34 supplies the electric power of the battery 27 as a constant voltage power to the microcomputer 35. The microcomputer 35 includes an central processing unit (CPU) 35a and its associated units such as a read-only memory (ROM) 35b, a random access memory (RAM) 35c and an input/output circuit (I/O) 35d. The central processing unit 35a performs auto-skid control in accordance with programmed instructions stored in the read-only memory 35b and using the input signals stored in the random access memory 35c and digital signals to and from the central processing unit 35a are carried along a common bus which is coupled to the associated units. Also included in the microcomputer 35 are drive circuits 36, 38 which is coupled to the input/output circuit 35d so as to supply drive signals corresponding to the control signal from the microcomputer 35 to the front-wheel side actuator 17 and the rear-wheel side actuator 19, respectively.

Figure 3:
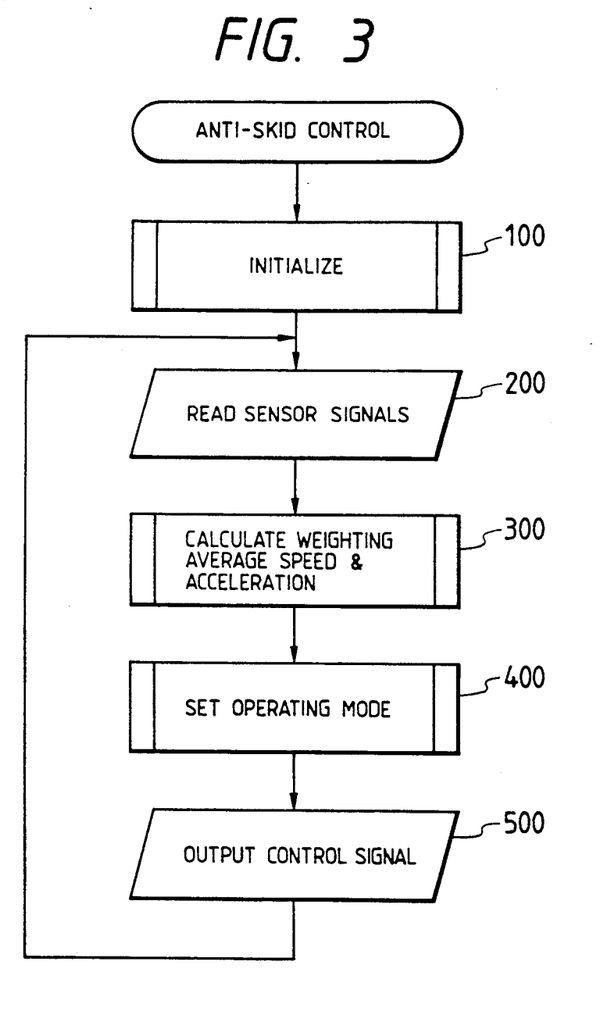
FIG. 3 is a flow chart showing a basic operation executed in accordance with a program prestored in the electronic control unit.

FIG. 3 is a flow chart showing basic operation executed in the electronic control unit 16 for anti-skid control. In FIG. 3, the program execution starts with a block 100 in response to turning-on of the ignition switch 27a where various temporary data such as flags are initialized. The initialization block 100 is followed by a block 200 to read the detection signals of the wheel speed sensors 5 to 7, the stop switch 28 and so on. Control then advances to a block 300 to calculate, on the basis of the wheels speed signals read in the previous block 200, the front-left and front-right wheel speeds $V_{WFL}$ and $V_{WFR}$, a weighted average wheel speed $V_{WFM}$ (which will be described hereinafter), and a weighted average wheel acceleration $DV_{WFM}$ which is a time-differentiation value of the weighted average wheel speed $V_{WFM}$. A block 400 follows to determine an operating mode corresponding to the weighted average wheel speed $V_{WFM}$ and the weighted average wheel acceleration $DV_{WFM}$, and the block 400 will hereinafter be described in detail. The block 400 is followed by a block 500 to generate a switching control signal to a solenoid-operated valve of the actuator 17 or 19 which in turn takes the operating mode determined in the previous block 400. After the execution of the block 500, the operational flow returns to the block 200 so that anti-skid control operation is performed at every predetermined time interval.

Figure 4:
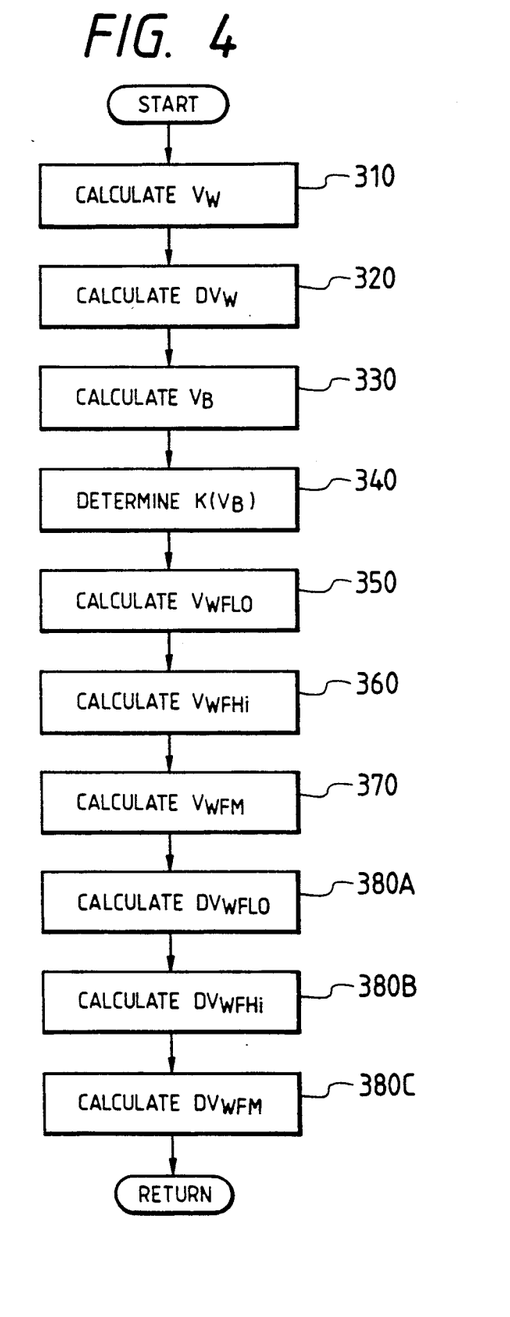
FIG. 4 is a flow chart for describing processes for obtaining a weighted average wheel speed to be used for the anti-skid control.
Figure 6:
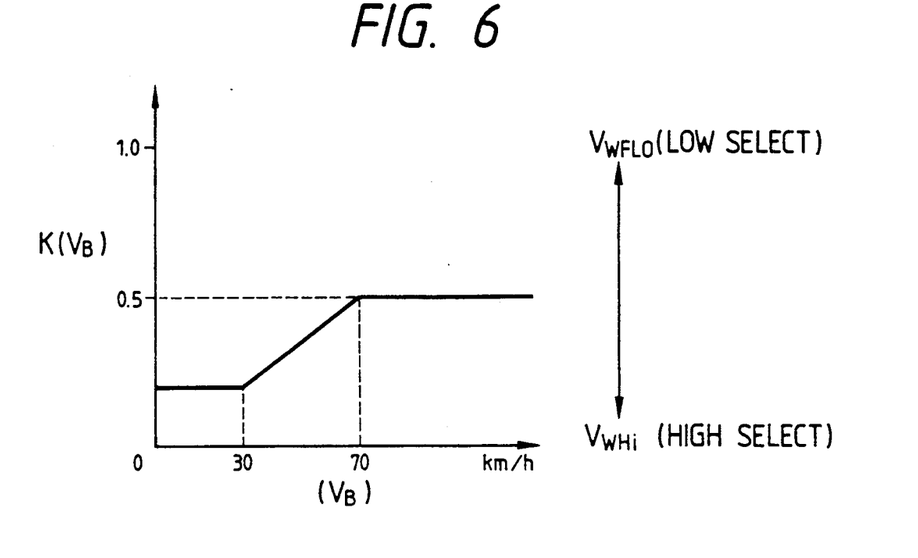
FIG. 6 is a graphic diagram showing the relation between a weighting coefficient and a vehicle speed.

FIG. 4 is a flow chart showing the operation made in the block 300 of FIG. 3. In FIG. 4, a step 310 is initially executed to calculate the front-right wheel speed, front-left wheel speed and rear wheel speed $V_{WFR}$, $V_{WFL}$, $V_{WRR}$ on the basis of the output signals of the wheel speed sensors 5 to 7. Control goes to a step 320 to differentiate the wheel speeds $V_{WFR}$, $V_{WFL}$, $V_{WRR}$ obtained in the step 310 so as to obtain wheel accelerations $DV_{WFR}$, $DV_{WFL}$, $DV_{WRR}$, followed by a step 330 to determine a vehicle speed $V_B$. Here, the maximum value of the wheel speeds $V_{WFR}$, $V_{WFL}$, $V_{WRR}$ is determined as the vehicle speed $V_B$, that is, $V_B \leftarrow \mathrm{MAX}(V_{WFR}, V_{WFL}, V_{WRR})$. Subsequently, a step 340 is executed to obtain a weighting coefficient $K(V_B)$ on the basis of the vehicle speed $V_B$ using a predetermined map prestored in the electronic control unit 16. FIG. 6 shows one example of the map. In FIG. 6, the weighting coefficient $K(V_B)$ is determined to be greater (0.5) when the vehicle speed $V_B$ is over 70 km/h and to be smaller (0.2) in the case that the vehicle speed $V_B$ is below 30 km/h. Control successively proceeds to steps 350 and 360 where comparison is performed between the front-left wheel speed $V_{WFL}$ and the front-right wheel speed $V_{WFR}$ so as to obtain the speed value $V_{WFLo}$ of the lower-speed wheel and the speed value $V_{WFHi}$ of the higher-speed wheel, that is, $V_{WFLo} \leftarrow \mathrm{MIN}(V_{WFR}, V_{WFL})$ and $V_{WFHi} \leftarrow \mathrm{MAX}(V_{WFR}, V_{WFL})$. Control advances to a step 370 to calculate a weighted average wheel speed $V_{WFM}$ using the weighting coefficient $K(V_B)$ by adding the value obtained by multiplying $K(V_B)$ by the lower value $V_{WFLo}$ to the value obtained by multiplying $\{1-K(V_B)\}$ by the higher value $V_{WFHi}$. That is, $V_{WFM} \leftarrow K(V_B) \cdot V_{WFLo} + \{1-K(V_B)\} \cdot V_{WFHi}$. Here, when the weighting coefficient $K(V_B)$ is 0.5, the weighted average wheel speed $V_{WFM}$ becomes a simple average value. On the other hand, when $K(V_B)$ is small, the control is effected to be weighted to higher-speed wheel side (so-called high select tendency). When $K(V_B)$ is larger, the control is effected to be weighted to the lower-speed wheel side (so-called low select tendency). After the execution of the step 370, control successively advances to steps 380A to 380C so as to calculate the acceleration $DV_{WFLo}$ of the lower-speed wheel on the basis of the wheel speed $V_{WFLo}$ obtained in the step 350, calculate the acceleration $DV_{WFHi}$ of the higher-speed wheel on the basis of the wheel speed $V_{WFHi}$ obtained in the step 360 and calculate a weighted average wheel acceleration $DV_{WFM}$ in accordance with an equation of $DV_{WFM} = K(V_B) \cdot DV_{WFLo} + \{1 - K(V_B)\} \cdot DV_{WFHi}$.

Figure 5:
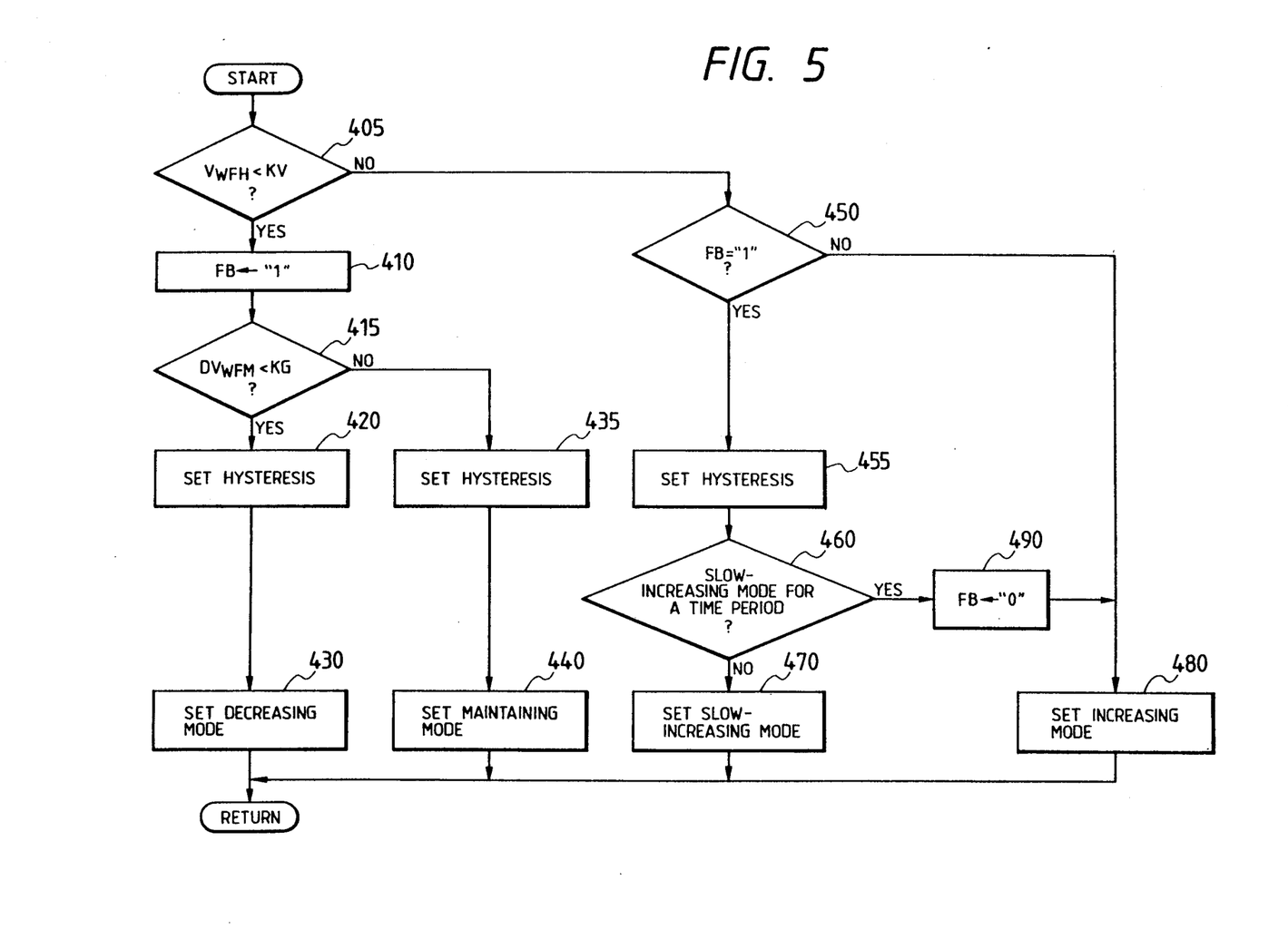
FIG. 5 is a flow chart for describing a control operation of a braking pressure adjusting device of the anti-skid control system.

Processes executed in the block 400 of FIG. 3 will be described hereinbelow with reference to FIG. 5. The description of the processes will be made with respect to only the front wheel side. In FIG. 5, the program begins with a step 405 to check whether the weighted average wheel speed $V_{WFM}$ is below a reference speed KV. If the answer of the decision step 405 is "YES", control goes to a step 410, and if the answer is "NO", control goes to a step 450. The step 410 is provided to set a flag FB to "1" indicating that the motor vehicle is on anti-skid control. The step 410 is followed by a step 415 to check whether the weighted average wheel acceleration $DV_{WFM}$ is below a reference acceleration KG. If affirmative, a step 420 follows to set a hysteresis P to the reference acceleration KG, i.e., $KG = KG + P$, then followed by a step 430 to set a pressure-decreasing mode.

On the other hand, in the step 450, it is checked whether the flag FB is set to "1". If not, control proceeds to a step 480 to set a pressure-increasing mode. If affirmative in the step 450, a step 455 is executed to set the hysteresis P, followed by a step 460 to check whether a slow pressure-increasing mode is continued over a predetermined time period. If the decision of the step 460 is "YES", control goes through a step 490 to the above-mentioned step 480 to set the pressure-increasing mode. The step 490 is provided to set the flag FB to "0". If the decision of the step 460 is "NO", control proceeds to a step 470 to set a slow pressure-increasing mode. Here, the slow pressure-increasing mode involves repeatedly executing predetermined times n an operating pattern comprising a pressure-increasing operation for a slight time period and a pressure-maintaining operation, the operating pattern being effected for a predetermined period and the predetermined period. If the decision of the step 415 is "NO", a step 435 is executed to set the hysteresis P, followed by a step 440 to set a pressure-maintaining mode.

With the above-described operation, as shown in FIG. 6, as the vehicle speed becomes greater, the weighting coefficient $K(V_B)$ becomes greater with respect to the lower-speed wheel side and on the contrary the weighting coefficient becomes smaller relatively with respect to the higher-speed wheel side. That is, since the weighted average wheel speed approaches the lower wheel speed, the braking control is effected with reference to the lower-speed wheel. Thus, on high speed running, the braking control is effected with reference to the speed of the lower-speed wheel which tends to be locked first and has an influence on running stability, resulting in excellent running stability and steering performance. On the other hand, as the vehicle speed becomes smaller, the weighting coefficient $K(V_B)$ becomes smaller with respect to the lower-speed wheel side and the weighting coefficient becomes greater relatively with respect to the higher-speed wheel. That is, since the weighted average wheel speed approaches the higher wheel speed, the braking control is effected with reference to the higher-speed wheel. Thus, on low speed running, the braking control is performed in accordance with the speed of the higher-speed wheel which has an influence on the braking efficiency, resulting in shortening the braking distance, i.e., slipping distance.

Although in the above-mentioned embodiment a single wheel speed sensor 7 is provided to detect the speeds of the rear side wheels 3, 4, it is also appropriate that two independent wheel sensors are provided at the rear side wheels 3, 4 so that the braking control is performed on the basis of a calculated weighted average wheel speed.

Figure 7:
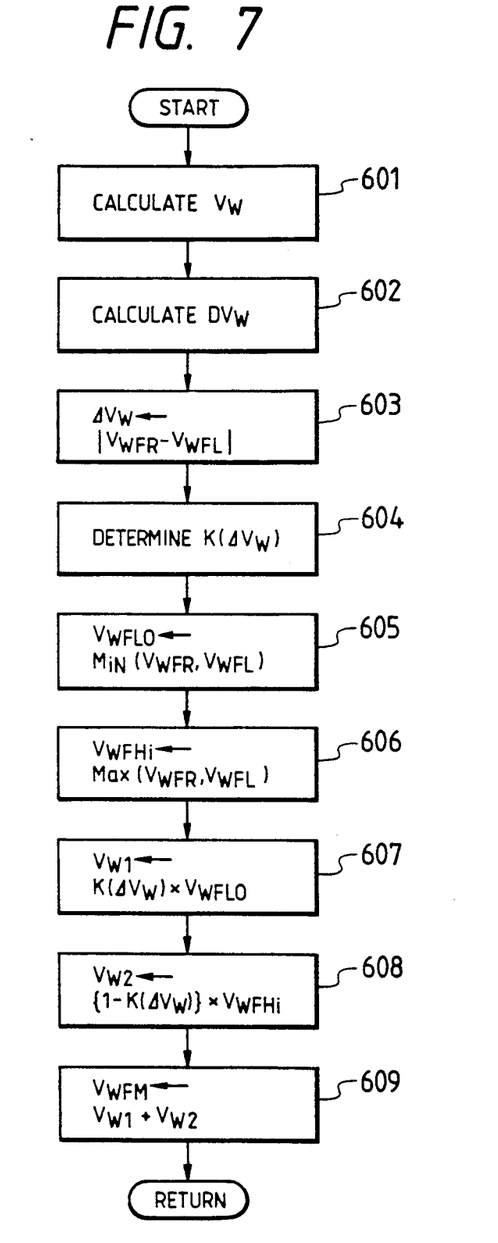
FIG. 7 is a flow chart for describing further processes for obtaining a weighted average wheel speed.
Figure 8:
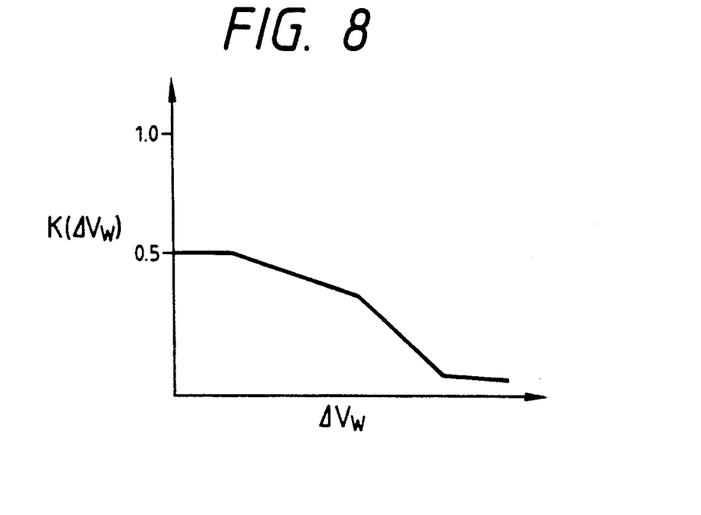
FIG. 8 is a graphic diagram for describing a weighting coefficient and the difference between wheel speeds.

FIG. 7 is a flow chart for describing another embodiment of the present invention in which the weighting coefficient for the left and right wheels is automatically corrected or changed when the motor vehicle is running on a road surface which has different road frictional coefficients $\mu$ with respect to the left and right wheels. FIG. 7 shows processes to be executed in the block 300 of the FIG. 3 flow chart, and the the weighted average wheel speed $V_{WFM}$ for the left and right wheels is calculated on the basis of a weighting coefficient $K(\Delta V_W)$ obtained in accordance with the difference between the speeds of the left and right wheels using a predetermined map. FIG. 8 shows the relation between the weighting coefficient $K(\Delta V_W)$ and the difference between the speeds of the left and right wheels under the condition that the right wheel is on a high $\mu$ road surface and the left wheel is on a low $\mu$ road surface.

In FIG. 7, the program starts at a step 601 to calculate wheel speeds $V_W$, followed by a step 602 to calculate wheel accelerations $DV_W$ on the basis of the calculated wheel speeds $V_W$. Control advances to a step 603 to obtain the speed difference $\Delta V_W$ between the front-left wheel and the front-right wheel. A step 604 follows to obtain a weighting coefficient $K(\Delta V_W)$ using a predetermined map as illustrated in FIG. 8, followed by a step 605 to perform comparison between the front-left wheel speed $V_{WFL}$ and the front-right wheel speed $V_{WFR}$ so as to set the speed of the lower-speed wheel as $VWFLo$ and further followed by a step 606 to set the speed of the higher-speed wheel as $V_{WFHi}$. Subsequently, a step 607 is executed to multiply the lower wheel speed $VWFLo$ by the weighting coefficient $K(\Delta V_W)$ obtained in the previous step 604 and to set the resultant value as $V_{W1}$, followed by a step 608 to multiply the higher wheel speed $V_{WFHi}$ by $\{1 - K(\Delta V_W)\}$ and to set the resulting value as $V_{W2}$. Control finally advances to a step 609 to obtain a weighted average wheel speed $V_{WFM}$ by addition of $V_{W1}$ and $V_{W2}$.

Figure 9:
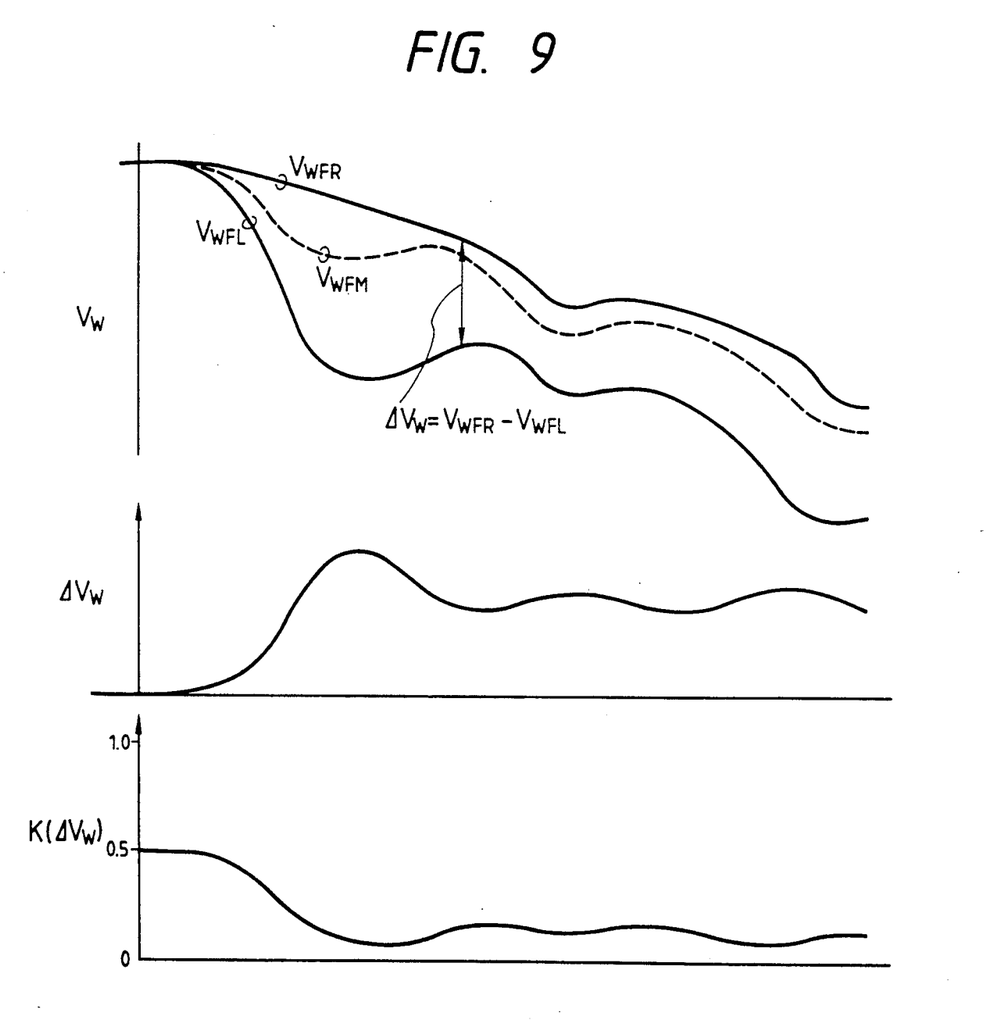
FIG. 9 is an illustration for describing the result of the processes shown in FIG. 7.

With the aforementioned processes, as shown in FIG. 9, as the difference $\Delta V_W$ between the speeds of the left and right wheels, the weighting coefficient $K(\Delta V_W)$ for the lower-speed wheel becomes smaller, whereas the weighting coefficient for the higher-speed wheel becomes greater relatively. Thus, the braking control is effected in accordance with the speed of the wheel which is running on a high $\mu$ road surface, thereby resulting in shortening the braking distance.

Figure 10:
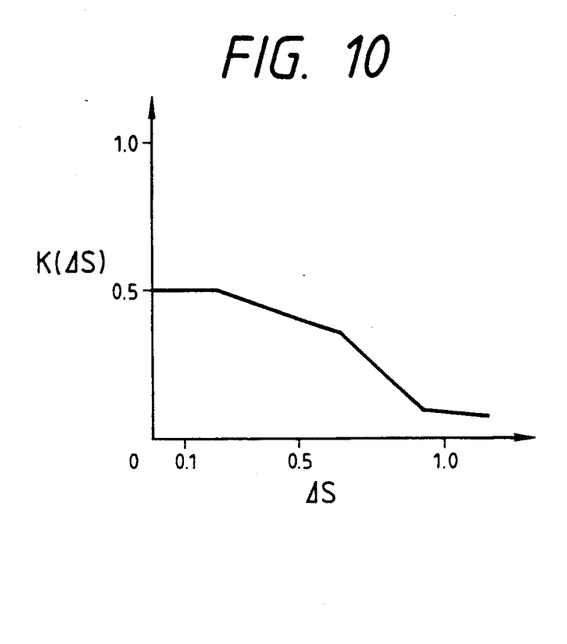
FIG. 10 is a graphic diagram showing the relation between a weighting coefficient and the difference between slip ratios of wheels.

Modifications of the automatic change of the weighting coefficient will be described hereinbelow. In this case, processes of the steps 603 and 604 of FIG. 7 may be different. That is, in the step 603, the vehicle speed $V_B$ is obtained and the difference $\Delta S$ of the slip ratios of the left and right wheels is obtained as $\Delta S = |V_{WFR} - V_{WFL}|/V_B$, and in the step 604, a weighting coefficient $K(\Delta S)$ is obtained on the basis of the slip ratio difference $\Delta S$ using a predetermined map as illustrated in FIG. 10. Here, since the weighting coefficient is derived from the difference between the slip ratios of the left and right wheels, the braking efficiency and running stability are compatible with each other irrespective of difference of road frictional coefficient with respect to the left and right wheels.

Figure 11:
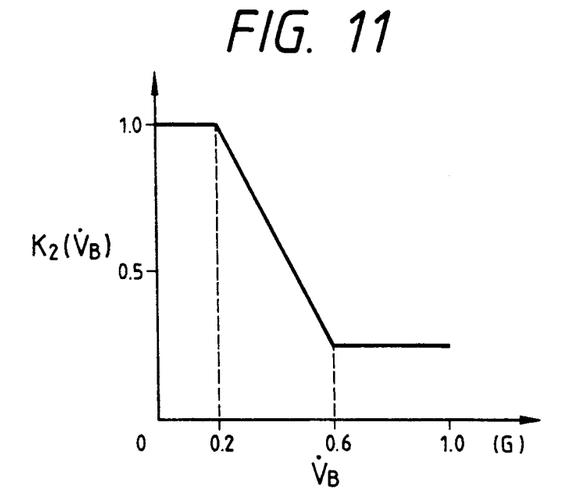
FIG. 11 is a graphic illustration for describing the relation between a weighting factor and a deceleration of a motor vehicle.
Figure 12:
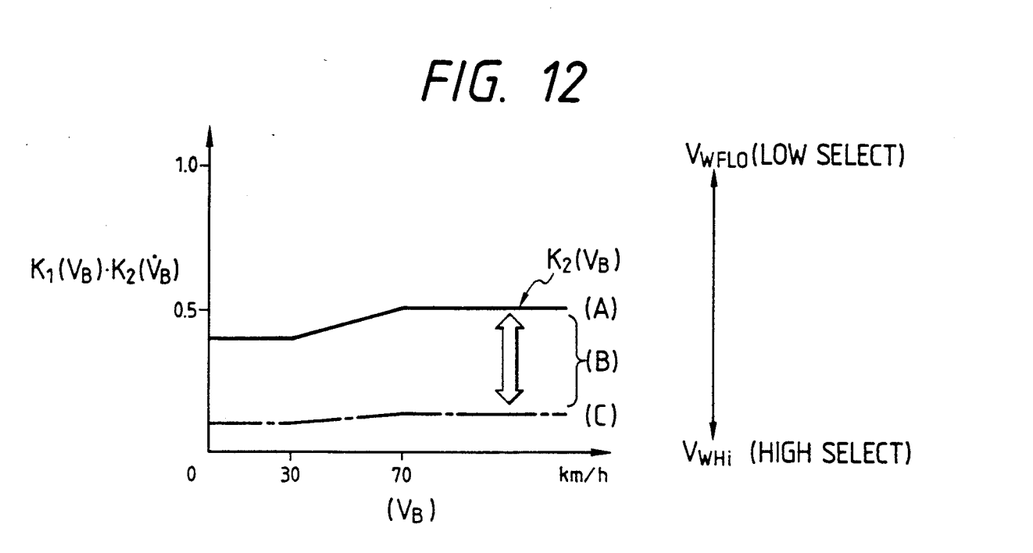
FIG. 12 is an illustration for describing the relation between a weighting coefficient and a vehicle speed and a vehicle deceleration.

Furthermore, it is also appropriate that the weighting coefficient is obtained on the basis of the vehicle speed $V_B$ and the vehicle deceleration $\dot{V}_B$. In this case, the weighting coefficient $K(V_B, \dot{V}_B)$ can be obtained by multiplication of a factor $K1(V_B)$ derived from the vehicle speed $V_B$ by a factor $K2(\dot{V}_B)$ derived from the vehicle deceleration $\dot{V}_B$. For example, the factor $K2(\dot{V}_B)$ may be determined on the basis of the vehicle deceleration $\dot{V}_B$ using a predetermined map as shown in FIG. 11 and as a result the coefficient $K(V_B, \dot{V}_B)$, i.e., multiplication of $K1(V_B)$ by $K2(\dot{V}_B)$, is determined to be varied between a solid line and an alternate long and short dash line of FIG. 12.

In addition, it is also appropriate that the weighting coefficient is determined by a combination of a road surface frictional coefficient estimation value $\mu^*$ and a vehicle speed $V_B$. Here, the weighting coefficient is expressed as $K(V_B, \mu^*)$. In this case, in the step 370 of FIG. 4, coefficient $K(V_B, \mu^*)$ is used instead of the coefficient $K(V_B)$, and in FIGS. 11 and 12, $V_B$ is replaced with $\mu^*$. The road surface frictional coefficient estimation value $\mu^*$ may be obtained by the wheel deceleration on start of anti-skid control and the slip ratio, or the returning time and returning acceleration at the time that the wheel speed approaches the vehicle speed after lowered. Further, it is possible to estimate it with the braking hydraulic pressure or the like on anti-skid control. When as described above the weighting coefficient is obtained on the basis of the vehicle deceleration or the road surface frictional coefficient estimation value, the weighting coefficient $(1-K)$ for the higher wheel speed becomes greater when the vehicle is running on a road surface having a great vehicle deceleration, i.e., on a high $\mu$ road surface, and the braking control is performed in accordance with the higher wheel speed $V_{WFHi}$. Therefore, a high braking force is applied so as to obtain an excellent braking efficiency. On the other hand, the braking control is effected on the basis of the lower wheel speed $V_{WFLo}$ when the vehicle is running on a road surface having a small vehicle deceleration, i.e., on a low $\mu$ road surface. Thus, the left and right wheels are prevented from being locked so as to improve the steering performance and running stability.

Figure 13:
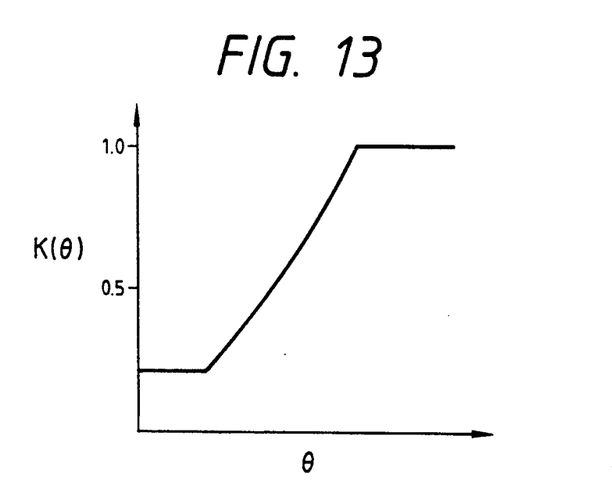
FIG. 13 is a graphic illustration for describing the relation between a weighting coefficient and a steering angle.

In addition, in the case that this system includes a steering sensor for detecting a steering angle $\theta$ of a steering wheel of this motor vehicle, a factor $K(\theta)$ is obtained on the basis of the steering angle $\theta$ using a map as illustrated in FIG. 13, and the weighting coefficient can be obtained by multiplication of the factor $K(V_B)$ by $K(\theta)$, i.e., as $K(V_B,') = K(\theta) \cdot K(V_B)$. The factor $K(\theta)$ is varied so as to become smaller when $\theta$ is smaller (at the time of straight running) and become greater when $\theta$ is greater (at the time of turning). As similar to the case shown in FIG. 12, the weighting coefficient $K(V_B, \theta)$ is small as indicated by (C) of FIG. 12 on straight running and the control is effected in accordance with the higher wheel speed $V_{WFHi}$ so as to provide an excellent braking efficiency. On the other hand, on turning the coefficient $K(V_B, \theta)$ is increased from (C) to (A) in accordance with increase of the steering angle $\theta$ and the control is finally effected on the basis of the lower wheel speed $V_{WFLo}$ so as to improve steering performance.

Figure 14:
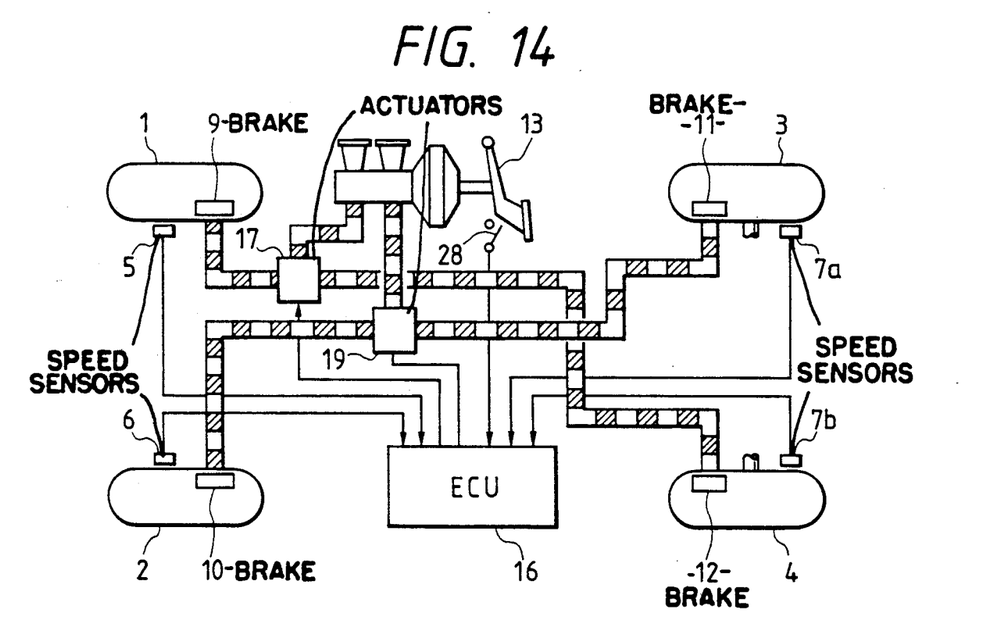
FIG. 14 shows an anti-skid control system according to the present invention which is incorporated into another arrangement of a braking system of a motor vehicle.
Figure 15:
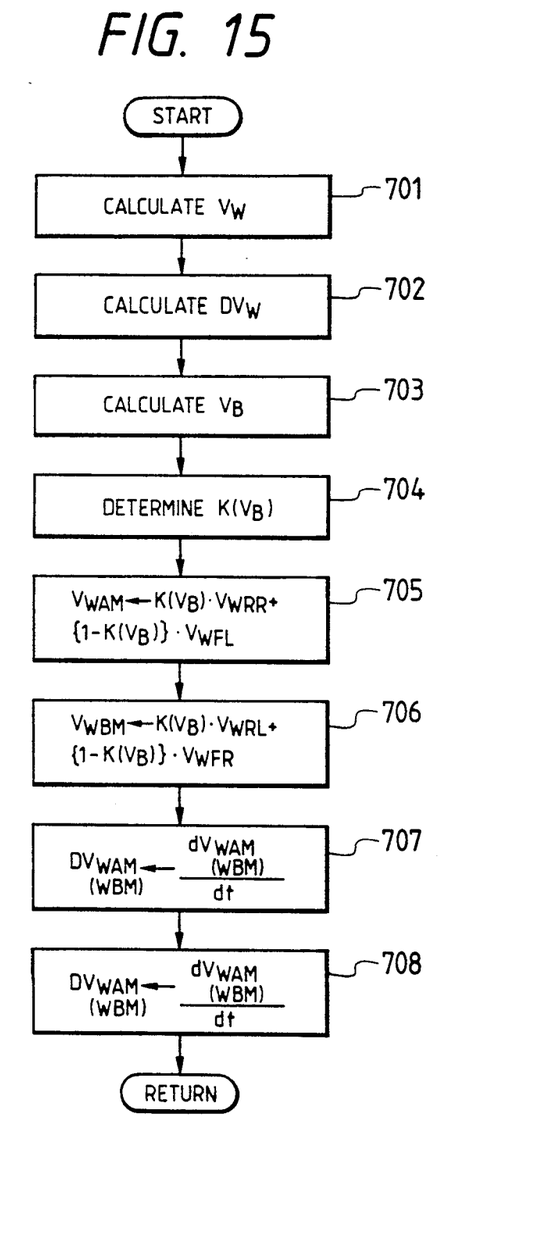
FIG. 15 is a flow chart showing an operation for obtaining a weighted average wheel speed in the case of the FIG. 14 anti-skid control system.

FIG. 14 illustrates an anti-skid control system of a further embodiment of the present invention which is incorporated into a motor vehicle in which an actuator 17 is associated in common with hydraulic pressure braking devices 9, 12 for the front-right wheel 1 and the rear-left wheel 4 and another actuator 19 is associated in common with hydraulic pressure braking devices 10, 11 for the front-left wheel 2 and the rear-right wheel 3. Parts corresponding to those in FIG. 1 are marked with the same numerals and the description thereof will be omitted for brevity. In this case, the block 300 of FIG. 3 comprises processes shown in FIG. 15. In FIG. 15, the program starts at a step 701 to calculate speeds $V_{WFR}$, $V_{WFL}$, $V_{WRR}$ and $V_{WRL}$ of the four wheels, followed by a step 702 to calculate wheel accelerations $DV_{WFR}$, $DV_{WFL}$, $DV_{WRR}$ and $DV_{WRL}$ of the four wheels by differentiating the speeds $V_{WFR}$, $V_{WFL}$, $V_{WRR}$ and $V_{WRL}$. Subsequently, a step 703 is executed to obtain a vehicle speed $V_B$ of this motor vehicle. The vehicle speed $V_B$ is determined as the maximum one of the obtained four wheel speeds $V_{WFR}$, $V_{WFL}$, $V_{WRR}$ and $V_{WRL}$. The program proceeds to a step 704 to obtain a weighting coefficient $K(V_B)$ on the basis of the obtained vehicle speed $V_B$ using a map similar to the map illustrated in FIG. 6. In a step 705, a weighted average wheel speed $V_{WAM}$ for the front-left wheel and the rear-right wheel is calculated in accordance with the following equation.

$$V_{WAM} = K(V_B) \cdot V_{WRR} + (1 - K(V_B)) \cdot V_{WFL}$$

In a step 706, a weighted average wheel speed $V_{WBM}$ for the front-right wheel and the rear-left wheel is calculated in accordance with the following equation.

$$V_{WBM} = K(V_B) \cdot V_{WRL} + (1 - K(V_B)) \cdot V_{WFR}$$

Thereafter, steps 707 and 708 are successively executed in order to differentiating the weighted average wheel speeds $V_{WAM}$ and $V_{WBM}$ so as to obtain accelerations $DV_{WAM}$ and $DV_{WBM}$.

In this embodiment, in a high speed range, the coefficient $K(V_B)$ becomes greater and the braking pressure is controlled on the basis of the rear side wheel speed which has an influence on the running stability, thereby causing an excellent stability. On the other hand, in a low speed range, the coefficient $K(V_B)$ becomes smaller and the braking pressure is controlled on the basis of the front side wheel speed which has a greater braking force distribution, thereby causing an excellent braking efficiency.

It should be understood that the foregoing relates to only preferred embodiments of the present invention, and that it is intended to cover all changes and modifications of the embodiments of the invention herein used for the purposes of the disclosure, which do not constitite departures from the spirit and scope of the invention. For example, although in the above-mentioned embodiments the braking pressure is controlled on the basis of the weighted average wheel speeds, it is also appropriate that the braking pressure is controlled on the basis of the weighted average slip ratios of the slip ratios of the respective wheels.

What is claimed is:

1. An anti-skid control system for use in a motor vehicle having at least first and second wheels and first and second wheel-braking cylinders, braking pressures applied to said first and second wheel-braking cylinders being adjusted by a single braking pressure adjusting device to become equal to each other, said control system comprising:

first and second wheel speed sensors for respectively detecting rotational speeds of said first and second wheels to output first and second signals indicative of the detected rotational speeds thereof;

running state detecting means for detecting a running state of said motor vehicle to output a signal indicative of the detected running state thereof;

weighting coefficient determining means for determining, on the basis of the running state detected by said running state detecting means, weighting coefficients for the speeds detected by said wheel speed detecting sensors and gradually changing the weighting coefficients thereof in accordance with variations of the running state thereof;

calculation means for calculating a weighted average wheel speed on the basis of the wheel speeds of said first and second wheels and the weighting coefficients determined by said weighting coefficient determining means; and control means for outputting a control signal to said barking pressure adjusting device in accordance with the calculated weighted average wheel speed so as to control the braking pressure to be applied to said first and second wheel-braking cylinders.

2. A control system as claimed in claim 1, wherein said first and second wheels are front-left and front-right wheels, respectively.

3. A control system as claimed in claim 1, wherein said running state detecting means detects a speed of said motor vehicle as the vehicle running state.

4. A control system as claimed in claim 3, wherein said running state detecting means detects, in addition to the vehicle speed, detects a deceleration of said motor vehicle, in addition to the vehicle speed, as the vehicle running state.

5. A control system as claimed in claim 3, wherein said weighting coefficient determining means determines the weighting coefficients for the speeds of said first and second wheels so as to be substantially equal to each other when the speed of said motor vehicle exceeds a predetermined value, and gradually increases the weighting coefficient for a higher one of the speeds of said first and second wheels as the vehicle speed becomes smaller than the predetermined value.

6. A control system as claimed in claim 5, wherein said weighting coefficient determining means substantially determines the weighting coefficients for said first and second wheels of the basis of only the vehicle speed when the deceleration of said motor vehicle is low, and gradually increases the weighting coefficient for the higher one of the speeds of said first and second wheels as the deceleration thereof becomes greater.

7. A control system as claimed in claim 5, wherein said weighting coefficient determining means determines the weighting coefficients for the speeds of said first and second wheels so as to be substantially equal to each other when the difference between the wheel speeds is small, and gradually increases the weighting coefficient for the higher one of the wheel speeds of said first and second wheels as the difference therebetween becomes greater.

8. A control system as claimed in claim 7, wherein said running state detecting means detects a difference between slip ratios of said first and second wheels as the vehicle running state.

9. A control system as claimed in claim 1, wherein said running state detecting means detects a difference between the speeds of said first and second wheels as the vehicle running state.

10. A control system as claimed in claim 9, wherein said weighting coefficient determining means determines the weighting coefficients for the speeds of said first and second wheels so as to be substantially equal to each other when the difference between the slip rations of said first and second wheel is small, and gradually increases the weighting coefficient for the higher one of the speeds of said first and second wheels as the difference therebetween becomes greater.

11. A control system as claimed in claim 1, wherein said running state detecting means detects a steering angle of said motor vehicle as the vehicle running state.

12. A control system as claimed in claim 11, wherein said weighting coefficient determining means increases the weighting coefficient for the lower one of the speeds of said first and second wheels when the steering angle exceeds a predetermined angle, and gradually increases the weighting coefficient for the higher one of the speeds of said first and second wheels as the steering angle becomes smaller than said predetermined angle.

* * * * *